UNITED STATES PATENT OFFICE.

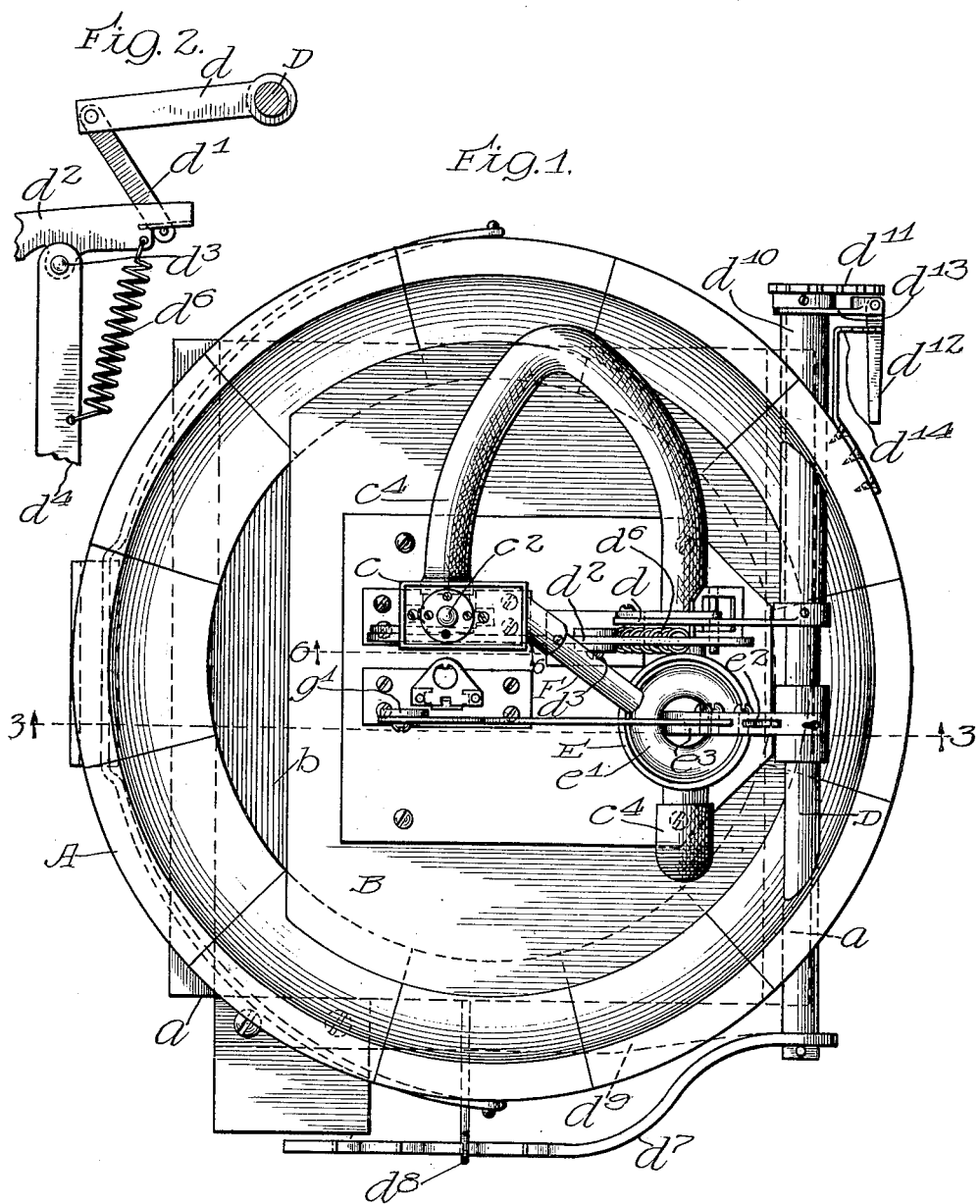

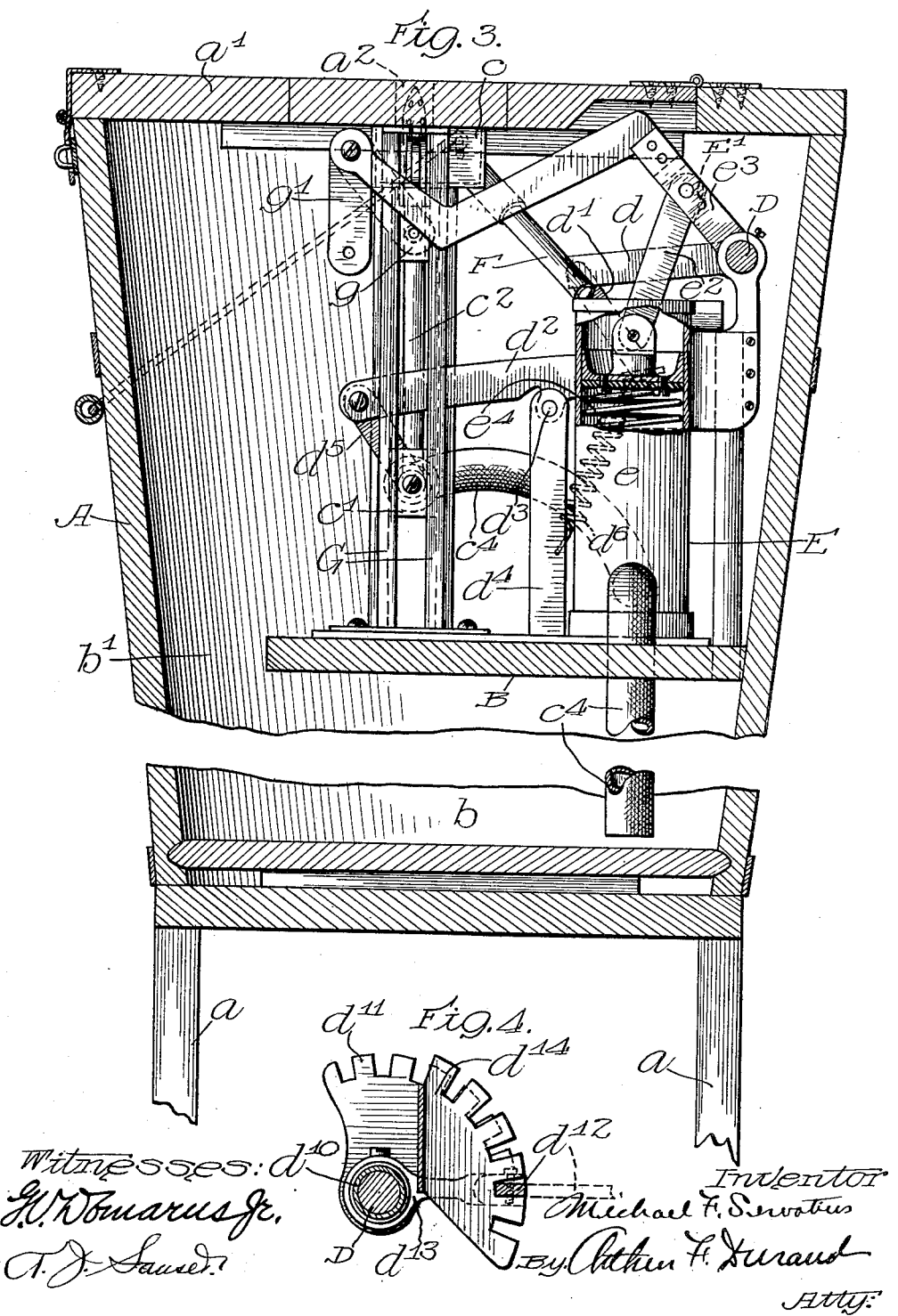

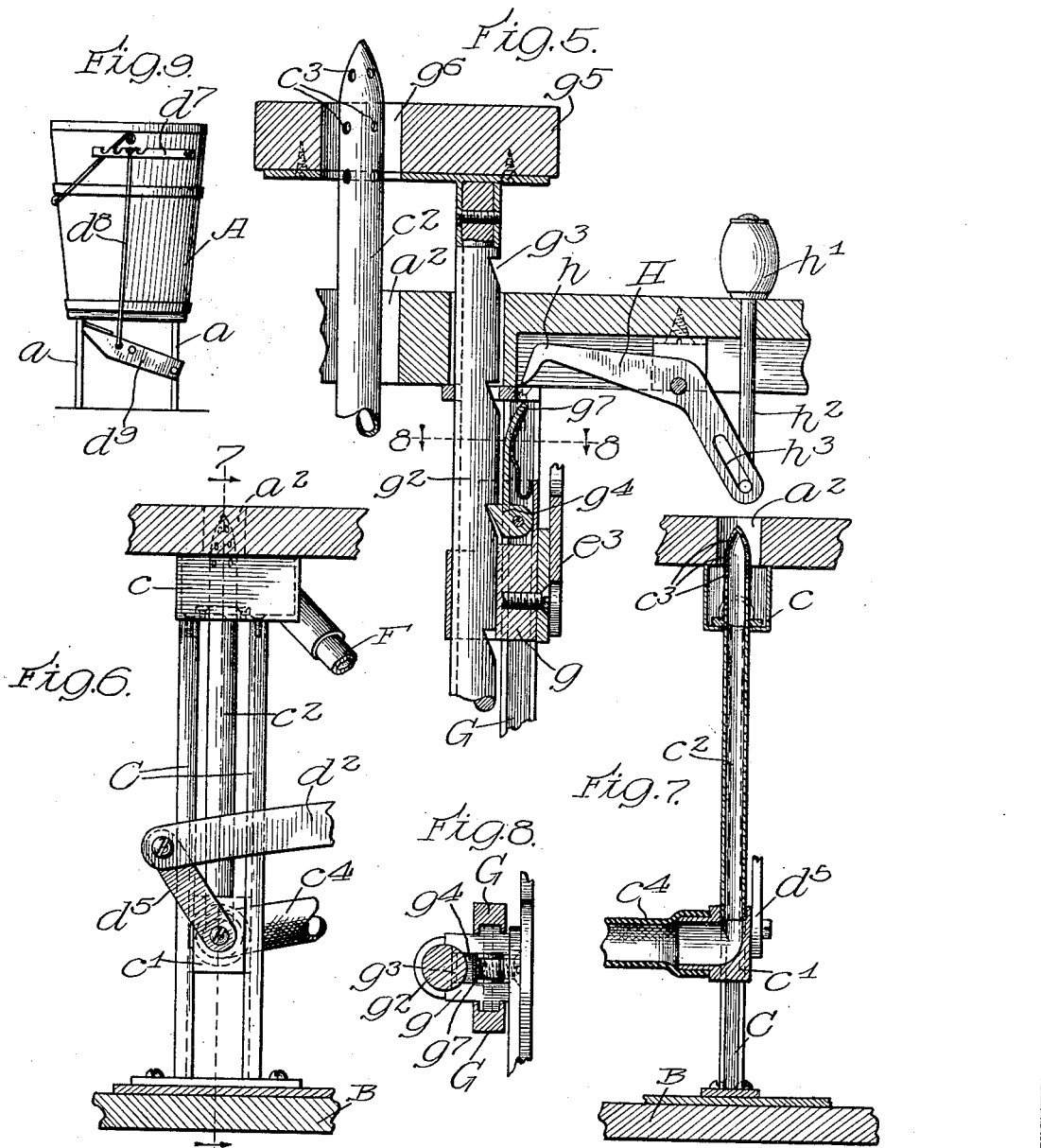

MICHAEL F. SERVATIUS, OF CHICAGO, ILLINOIS.

MEAT-CURING MACHINE.

1,126,579. Specification of Letters Patent. Patented Jan. 26, 1915.

Application filed December 9, 1911. Serial No. 664,720.

*To all whom it may concern:*

Be it known that I, MICHAEL F. SERVATIUS, a citizen of the United States of America, and resident of Chicago, Cook county, Illinois, have invented a certain new and useful Improvement in Meat-Curing Machines, of which the following is a specification.

My invention relates to machines or devices for curing or seasoning meat by an injection of salt water or other fluid. The purpose of a machine or device of this kind, as is well known, is to hasten or expedite the curing of meat. Without such a machine or device, the meat must be cured in the ordinary manner by simply soaking it in the salt water or other liquid. With a machine or device of suitable character, the liquid can be injected into the meat, and the desired curing action thus hastened or expedited to some extent.

The principal object of my invention is, therefore, to provide a machine of novel and desirable character for curing meat more easily and quickly than heretofore.

Special objects of my invention are to provide a portable machine by which meat curing can be effectively carried on in a house or meat-shop or any other place; to provide a machine of this kind the operation of which will require but little effort; to provide a meat curing machine that can be operated by simply manipulating or working the piece of meat up and down thereon; to provide a meat curing machine that can be readily adjusted to suit the requirements of different cases and different kinds of work, and to insure the desired results; to provide a machine for this purpose which will not waste the curing fluid; and to provide certain details and features of improvement tending to increase the general efficiency of a meat curing machine of this particular character.

To the foregoing and other useful ends, my invention consists in matters hereinafter set forth and claimed.

In the accompanying drawings—Figure 1 is a plan of a meat curing machine embodying the principles of my invention, the top or cover thereof being removed to show the operating and pumping devices and other interior parts. Fig. 2 is a detail view of a part of the operating mechanism. Fig. 3 is a vertical section on line 3—3 in Fig. 1. Fig. 4 is an enlarged detail view of the device for controlling the position and length of stroke of the member which penetrates the meat. Fig. 5 is an enlarged detail section showing the device for locking and unlocking the meat rest by which the machine is operated in one way. Fig. 6 is a detail section on line 6—6 Fig. 1. Fig. 7 is a vertical section on line 7—7 in Fig. 6. Fig. 8 is a horizontal detail section on line 8—8 in Fig. 5. Fig. 9 is a reduced side elevation of the entire machine.

As thus illustrated, my invention comprises a receptacle A mounted on a base $a$ and provided with a removable cover $a'$. A shelf B is mounted in the receptacle A to support the various operative parts and to provide a chamber $b$ below for the salt water or other liquid. An opening $b'$ can be provided for supplying the liquid to the chamber $b$.

A pair of vertical guides C are mounted on the shelf B at or near the center of the receptacle, and are connected together at their upper ends by the box $c$. A hollow cross head $c'$ slides up and down in said guides, and is provided with a vertical tube $c^2$ that slides up and down in a hole in the bottom of said box, and in a hole $a^2$ in the top or cover of the receptacle. This tube has a sharp upper end, and is provided with a number of apertures $c^3$ for injecting the liquid into the meat. The liquid flows through a flexible pipe $c^4$ to the cross head $c'$, and then upwardly in the tube.

The means for operating the tubular member $c^2$ are as follows: A rock shaft D is mounted in suitable bearings on the receptacle or elsewhere, and may be operated in any suitable manner. As shown, the shaft D is provided with an arm $d$, which latter carries a link $d'$ that has a sliding connection with the end of the lever $d^2$, this lever having a fulcrum $d^3$ on the upper end of the stationary post $d^4$. The other end of this lever is connected by a link $d^5$ with the cross head $c'$, and a spring $d^6$ connects the lever $d^2$ with the said post. This spring tends to lift the cross head $c'$, the tension being applied at the other side of the fulcrum, and this in turn lifts the sharp member $c^2$ and drives it into the meat. The shaft D has a notched arm $d^7$ on the outside of the receptacle, and this arm is connected by a rod $d^8$ with the foot treadle $d^9$ pivoted on the base, said rod being adjustable to any notch on said arm to vary the power and the stroke. When the foot treadle is depressed, the link $d'$ slides down in the end of the lever $d^2$, and this allows the spring $d^6$ to pull the lever down and thereby drive the member $c^2$ upward and into the meat. If the sharp point strikes a bone, the loose connection between the link $d'$ and the lever $d^2$ permits the said member to stop, and allows the foot treadle to descend to the limit of its downward stroke without breaking anything.

To vary the stroke of the member $c^2$, and to enable he said member to remain stationary, the arm $d$ is mounted on a sleeve $d^{10}$ on the shaft D, which sleeve is provided with means for adjustably locking it to the shaft. The said means consists of a segment $d^{11}$ fixed on the shaft, and an arm or catch $d^{12}$ pivoted on a collar $d^{13}$ fixed on the sleeve. A segment $d^{14}$ is secured to the receptacle A at the other side of the collar $d^{13}$. The arm $d^{12}$ can be swung into engagement with any notch on the segment $d^{11}$ to change the position and stroke of the member $c^2$. By swinging the arm $d^{12}$ into engagement with a notch on the segment $d^{14}$ the member $c^2$ can be held stationary during the rocking of the shaft D. The stationary position can be changed or varied by moving the arm $d^{12}$ from one notch to another on the segment $d^{14}$.

The liquid is supplied to the pipe $c^4$ by a pump E that sets on the shelf B in the receptacle. This pump has a cylinder or barrel $e$ which provides a support for one of the bearings for the shaft D and in which a piston $e'$ slides up and down, said piston being connected by a link $e^2$ with the arm $e^3$ on the rock shaft D. The upward movement of the pump plunger is limited by the link $c^2$ striking a shoulder E′ in the arm $e^3$, whereby the liquid is prevented from being entirely emptied from the top of the pump. A heavy spring $e^4$, or at least one heavier and stronger than the spring $d^6$, is inclosed in the cylinder $e$ to move the plunger $e'$ upward to normal position. When the plunger moves down it forces the liquid from the pump into the pipe $c^4$, and then into the member $c^2$, thus injecting it into the meat. The spring $e^4$ then moves the plunger upward, thus rocking the shaft D and thereby drawing the member $c^2$ downward and out of the meat. During this upward movement of the plunger, liquid is drawn into the pump from the reservoir $b$ through a pipe $c^4$, a check valve being located in this pipe, or in the bottom of the pump, to prevent the liquid from running back into the reservoir when the plunger moves down. A pipe F connects the box $c$ with the top of the pump, whereby the overflow or surplus liquid is discharged into the top of the pump, and from the latter back into the chamber $b$ at the bottom of the receptacle. In this way the liquid is not only economized, but the flooding of the pump keeps the plunger working properly. The member $c^2$ slides up and down in suitable packing or other similar means to prevent the drippings from leaking around the hole in the bottom of the box $c$ that serves as a drip cup. By reason of the spring $d^6$, the pump can operate or complete its stroke after the member $c^2$ ceases to move upward. With this arrangement the meat is laid on the cover $a'$ and the foot treadle $d^9$ is then worked to cause the member $c^2$ to penetrate the meat. This also causes the liquid to be injected into the meat.

Another method of using or operating the machine is as follows: The two vertical guides G are arranged adjacent the guides C, and are provided with an up and down sliding cross head $g$ adapted to be connected by a link $g'$ with the arm $e^3$. A rod $g^2$ is adapted to be adjusted up and down in the cross head $g$, and has notches $g^3$ adapted to be engaged by a spring catch $g^4$ on the cross head. The upper end of said rod has a meat rest $g^5$ provided with a hole $g^6$ for the member $c^2$ to move up and down in while the said rest moves in the opposite direction each time. Having adjusted the position of the meat rest on the cross head $g$, by causing the catch $g^4$ to engage the proper notch $g^3$, the meat is placed on the said rest $g^5$, and the operator then bears down on the meat. This causes the rest $g^5$ to move down, and in this way the arm $e^3$ rocks the shaft D and causes the member $c^2$ to move upward and into the downwardly moving meat. At the same time the pump is operated to pump liquid into the meat. As the member $c^2$ can be held stationary, by placing the arm $d^{12}$ in engagement with the segment $d^{14}$, the meat will then move downward without any upward movement of the member $c^2$. Thus the manipulation of the meat on the machine is sufficient in itself to do the required work.

Thus it will be seen that this machine can be used or operated in various ways. The pump may work while the member $c^2$ stands still. The position and stroke of this member $c^2$ can be adjusted for different kinds of work and to suit the requirements of any particular case. With a machine of this kind meat can be cured rapidly and effectively. For example, corned beef can be made in a satisfactory manner and in much less time than by the old method of simply soaking the meat in salt water. Moreover, the entire operation of curing a piece of meat is accomplished by one person.

To release the catch $g^4$, a lever H is pivoted on the underside of the cover $a'$, and is provided with an end portion $h$ adapted to engage the upper end portion $g^7$ of said catch to disengage the latter from the notches $g^3$. A handle $h'$ has a rod $h^2$ that connects with a slot $h^3$ in the lever H, which handle can be lifted to operate the lever and thereby release the catch. The said slot is necessary to permit movement of the lever while the rod $h^2$ is moving directly upward. Any suitable device can be used for this purpose.

As the machine thus constructed and operated is obviously susceptible of change or modification without departing from the spirit of my invention, I do not limit myself to the exact construction shown and described. For example, the machine may have any suitable number of tubes $c^2$, or needles as they may be called, and each needle may work independently of the others. In any event, though, each needle is backed by a spring, as shown, whereby the needle or needles do not operate by positive pressure, but by spring pressure which yields to prevent breakage when a bone is encountered. This is true, it will be seen, regardless of whether the needle is working or held stationary. If desired, a weight or any other suitable means can be substituted for the spring, as any suitable means can be employed to accomplish the yielding of the needle to prevent breakage. Moreover, the needle or needles can be arranged to work downward or upward or sidewise or in any direction.

As the pump plunger is kept flooded or submerged by the drippings from the needle, no air can be pumped into the meat. No air can enter the needle, as the pump is automatically refilled before the needle is withdrawn. Also and in the same arrangement and mode of operation shown and described, the fluid is discharged throughout the entire progress of the insertion of the needle in the meat.

What I claim as my invention is:

1. In a meat curing machine, a member for piercing the meat, and means for supplying a curing fluid to said member, the said member being apertured to discharge the fluid into the meat, mechanism for reciprocating said member, means for operating said mechanism, and guides for said member.

2. In a meat curing machine, a member for piercing the meat, means for supplying a curing fluid to said member, the said member being apertured to discharge the fluid into the meat, and a base upon which said member is supported in an upright position.

3. In a meat curing machine, a member for piercing the meat, means for supplying a curing fluid to said member, the said member being apertured to discharge the fluid into the meat, and devices for adjusting said member to different positions.

4. In a meat curing machine, a member for piercing the meat, means for supplying a curing fluid to said member, the said member being apertured to discharge the fluid into the meat, and mechanism for operating said member, adapted to lock said member in adjusted position.

5. In a meat curing machine, a member for piercing the meat, means for supplying a curing fluid to said member, the said member being apertured to discharge the fluid into the meat, a spring for forcing the member into the meat to prevent breakage if the member strikes a bone, and means for withdrawing said member from the meat.

6. In a meat curing machine, a member for piercing the meat, means for supplying a curing fluid to said member, the said member being apertured to discharge the fluid into the meat, said means comprising a pump cylinder and piston, a device for actuating the piston forward, a spring for actuating the piston backward, and means whereby said spring retracts said member.

7. In a meat curing machine, a member for piercing the meat, means for supplying a curing fluid to said member, the said member being apertured to discharge the fluid into the meat, a spring for forcing said member into the meat, and a stronger spring for withdrawing the member from the meat.

8. In a meat curing machine, a member for piercing the meat, means for supplying a curing fluid to said member, the said member being apertured to discharge the fluid into the meat, and a meat rest for operating said means.

9. In a meat curing machine, a member for piercing the meat, means for supplying a curing fluid to said member, the said member being apertured to discharge the fluid into the meat, a movable meat rest for operating said member, and means for adjusting the position of said rest.

10. In a meat curing machine, a member for piercing the meat, means for supplying a curing fluid to said member, the said member being apertured to discharge the fluid into the meat, means for supporting the said member in position, and a meat rest adjacent said member, serving as a stop for the meat to limit the insertion of said member therein.

11. In a meat curing machine, a member for piercing the meat, means for supplying a curing fluid to said member, the said member being apertured to discharge the fluid into the meat, and guides for the said member, said means comprising a hollow cross head sliding in said guides, and a flexible pipe connected with said cross head.

12. In a meat curing machine, a member for piercing the meat, means for supplying a curing fluid to said member, the said member being apertured to discharge the fluid into the meat, and means including a foot treadle for operating said member and means.

13. In a meat curing machine, a member for piercing the meat, means for supplying a curing fluid to said member, the said member being apertured to discharge the fluid into the meat, a meat rest, and means for changing the position of said meat rest to vary the extent to which said member penetrates the meat.

14. In a meat curing machine, a member for piercing the meat, means for supplying a curing fluid to said member, the said member being apertured to discharge the fluid into the meat, a meat rest, means by which said meat rest operates the said member, the said member and meat rest being movable simultaneously in opposite directions, and means for adjusting the position of said meat rest.

15. In a meat curing machine, a member for piercing the meat, means for supplying a curing fluid to said member, the said member being apertured to discharge the fluid into the meat, mechanism for operating said member, and means for varying the stroke of said member.

16. In a meat curing machine, a member for piercing the meat, means for supplying a curing fluid to said member, the said member being apertured to discharge the fluid into the meat, a rock shaft, a sleeve on said shaft, a segment on said shaft, a stationary segment, and means on said sleeve for engaging either one of said segments, said sleeve being connected for operating said member.

17. In a meat curing machine, a member for piercing the meat, means for supplying a curing fluid to said member, the said member being apertured to discharge the fluid into the meat, a rock shaft, a sleeve on said shaft, a segment on said shaft, a stationary segment, means on said sleeve for engaging either one of said segments, said sleeve being connected for operating said member, and means whereby the said means are operated by said shaft.

18. In a meat curing machine, a member for piercing the meat, means for supplying a curing fluid to said member, the said member being apertured to discharge the fluid into the meat, said means comprising a pump, and means for catching the surplus fluid and discharging it into the top of said pump.

19. In a meat curing machine, a member for piercing the meat, means for supplying a curing fluid to said member, the said member being apertured to discharge the fluid into the meat, a meat rest, a vertical stem for said meat rest, said stem having notches, a sliding device for operating said member and means, a catch on said device for engaging said notches, and means for disengaging the said catch to permit adjustment of the meat rest on said device.

20. In a meat curing machine, a member for piercing the meat, means for supplying a curing fluid to said member, the said member being apertured to discharge the fluid into the meat, a portable receptacle for containing the said means and member, said receptacle having a cover with an opening through which said member projects upwardly.

21. In a meat curing machine, a member for piercing the meat, pumping means for supplying a curing fluid to said member, the said member being apertured to discharge the fluid into the meat, and mechanism whereby the downward pressure of the meat operates said means.

22. A meat curing machine comprising a member for piercing the meat, means for supporting the needle in position, and means whereby said member yields when it strikes a bone or other obstruction.

23. A meat curing machine comprising a member for piercing the meat, and means designed and applied for preventing breakage when the needle strikes a bone or other obstruction.

24. A meat curing machine comprising a member for piercing the meat, means for supporting said member in operative position, preventing lateral displacement thereof, and means for supplying a curing fluid to said member.

25. A meat curing machine comprising a member for piercing the meat, means for supporting said member in operative position, preventing lateral displacement thereof, means for supplying a curing fluid to said member, and mechanism for reciprocating said member endwise.

26. A meat curing machine comprising a member for piercing the meat, means for supporting said member in operative position, preventing lateral displacement thereof, means for supplying a curing fluid to said member, and a meat support for limiting the insertion of said member.

27. A meat curing machine comprising a member for piercing the meat, means for supporting said member in operative position, preventing lateral displacement thereof, means for supplying a curing fluid to said member, mechanism for reciprocating said member endwise, and a liquid pump also operated by said mechanism.

28. A meat curing machine comprising a member for piercing the meat, means for supporting said member in operative position, preventing lateral displacement thereof, means for supplying a curing fluid to said member, a meat support for limiting the insertion of said member, and a liquid pump operated by the weight of the meat on said rest.

29. A meat curing machine comprising a member for piercing the meat, means for supporting said member in operative position, preventing lateral displacement thereof, means for supplying a curing fluid to said member, and a spring for preventing breakage when the said member strikes a bone or other obstruction.

30. A meat curing machine comprising a member for piercing the meat, means for supporting said member in operative position, preventing lateral displacement thereof, means for supplying a curing fluid to said member, mechanism for reciprocating said member endwise, a liquid pump also operated by said mechanism, and a spring for permitting said pump to complete its stroke after the said member strikes a bone or other obstruction.

31. A meat curing machine comprising a member for piercing the meat, means for supporting said member in operative position, preventing lateral displacement thereof, means for supplying a curing fluid to said member, a meat support for limiting the insertion of said member, a liquid pump operated by the weight of the meat on said rest, and a spring for permitting said pump to complete its stroke after the said member strikes a bone or other obstruction.

32. A meat curing machine comprising a member for piercing the meat, means for supporting said member in operative position, preventing lateral displacement thereof, and means for supplying a curing fluid to said member, said member having means serving, in conjunction with said means of supply, to discharge the said fluid during the entire progress of insertion thereof in the meat.

33. A meat curing machine having a reciprocating member for piercing the meat, mechanism including a crank arm for operating said member, a foot treadle, a connection between said treadle and arm, and means whereby said connection is adjustable longitudinally of said arm.

34. A meat curing machine having a reciprocating member for piercing the meat, mechanism including a crank arm for operating said member, a foot treadle, a connection between said treadle and arm, and means whereby said connection is adjustable longitudinally of said arm, said means comprising notches along the upper edge of said arm.

35. In a meat curing machine, a movably mounted piercing member, a meat support, and means for adjusting the position of the said member relative to said support.

36. In a meat curing machine, a movably mounted piercing member, a meat support, and means for adjusting the position of the said member relative to said support, said means comprising a toothed segment, a rock sleeve, and a locking device for engaging said segment, secured to said sleeve.

37. In a meat curing machine, a movably mounted piercing member, a meat support, means for adjusting the position of the said member relative to said support, said means comprising a toothed segment, a rock sleeve, and a locking device for engaging said segment, secured to said sleeve, together with a shaft in said sleeve, means operated by said shaft for supplying a fluid to said member, and locking means for engaging said device, secured to said shaft.

Signed by me at Chicago, Illinois, this 5th day of December 1911.

MICHAEL F. SERVATIUS.

Witnesses:
 GEO. F. SCHMIDT,
 S. LEWIS.

Copies of this patent may be obtained for five cents each, by addressing the "Commissioner of Patents, Washington, D. C."